United States Patent
Pedreira et al.

(10) Patent No.: US 10,550,284 B2
(45) Date of Patent: Feb. 4, 2020

(54) AQUEOUS BASED POLYURETHANE/ACRYLATE HYBRID DISPERSIONS

(71) Applicant: Michelman, Inc., Cincinnati, OH (US)

(72) Inventors: Marcos Chas Pedreira, Recklinghausen (DE); Steven Reekmans, Windhof (LU); Michael Kramer, Loveland, OH (US)

(73) Assignee: Michelman, Inc., Cincinnati, OH (US)

( * ) Notice: Subject to any disclaimer, the term of this patent is extended or adjusted under 35 U.S.C. 154(b) by 128 days.

(21) Appl. No.: 15/649,937

(22) Filed: Jul. 14, 2017

(65) Prior Publication Data

US 2018/0016465 A1    Jan. 18, 2018

Related U.S. Application Data

(60) Provisional application No. 62/362,419, filed on Jul. 14, 2016.

(51) Int. Cl.

| | | |
|---|---|---|
| *C09D 175/04* | (2006.01) | |
| *C08G 18/32* | (2006.01) | |
| *C08G 18/24* | (2006.01) | |
| *C08G 18/36* | (2006.01) | |
| *C08G 18/40* | (2006.01) | |
| *C08G 18/48* | (2006.01) | |
| *C08F 299/06* | (2006.01) | |
| *C08G 18/08* | (2006.01) | |
| *C08G 18/67* | (2006.01) | |
| *C08G 18/66* | (2006.01) | |
| *C08G 18/75* | (2006.01) | |
| *C08G 18/34* | (2006.01) | |
| *C08G 18/42* | (2006.01) | |

(52) U.S. Cl.
CPC ........ *C09D 175/04* (2013.01); *C08F 299/065* (2013.01); *C08G 18/0823* (2013.01); *C08G 18/246* (2013.01); *C08G 18/3212* (2013.01); *C08G 18/3228* (2013.01); *C08G 18/348* (2013.01); *C08G 18/36* (2013.01); *C08G 18/4018* (2013.01); *C08G 18/4233* (2013.01); *C08G 18/4238* (2013.01); *C08G 18/4833* (2013.01); *C08G 18/4837* (2013.01); *C08G 18/4891* (2013.01); *C08G 18/6662* (2013.01); *C08G 18/6674* (2013.01); *C08G 18/672* (2013.01); *C08G 18/758* (2013.01); *C08G 2170/80* (2013.01)

(58) Field of Classification Search
CPC ............. C09D 175/04; C08G 18/4018; C08G 18/4837; C08G 18/246; C08G 18/36; C08G 18/3228

See application file for complete search history.

(56) References Cited

U.S. PATENT DOCUMENTS

| | | | |
|---|---|---|---|
| 6,642,304 B1 | 11/2003 | Hansen et al. | |
| 8,637,609 B1 * | 1/2014 | Perumal | C09D 175/04 |
| | | | 525/209 |
| 9,234,068 B2 | 1/2016 | Yuan et al. | |
| 9,303,181 B2 | 4/2016 | Zhang et al. | |
| 2003/0087567 A1 | 5/2003 | Moore | |
| 2011/0009561 A1* | 1/2011 | Pajerski | C08F 290/147 |
| | | | 524/591 |
| 2011/0009566 A1 | 1/2011 | Pajerski et al. | |
| 2012/0041131 A1 | 2/2012 | Sommer et al. | |
| 2013/0023599 A1 | 1/2013 | Hsiao et al. | |
| 2014/0323638 A1 | 10/2014 | Zhang et al. | |
| 2015/0240077 A1 | 8/2015 | Steinbrecher et al. | |

FOREIGN PATENT DOCUMENTS

| | | |
|---|---|---|
| CN | 105111408 A | 12/2015 |
| EP | 709414 A1 | 5/1996 |
| EP | 1849810 A1 | 10/2007 |
| EP | 2765147 A1 | 8/2014 |
| WO | 9812273 A1 | 3/1998 |
| WO | 2001002455 A1 | 1/2001 |
| WO | 2006047431 A1 | 5/2006 |
| WO | 2006047434 A1 | 5/2006 |
| WO | 2006055987 A1 | 5/2006 |
| WO | 2008041999 A1 | 4/2008 |
| WO | 2010117838 A1 | 10/2010 |
| WO | 2011107398 A1 | 9/2011 |
| WO | 2012093104 A1 | 7/2012 |
| WO | 2014040708 A2 | 3/2014 |
| WO | 2014182624 A1 | 11/2014 |
| WO | 2015191351 A1 | 12/2015 |
| WO | 2015191936 A1 | 12/2015 |

OTHER PUBLICATIONS

Erdem, B. et al., Ahead of the field (Part 2), European Coatings Journal, 2009, Issue 10, 8 pages.
International Search Report and Written Opinion issued in International Patent Application No. PCT/US2017/042038, dated Sep. 19, 2017, 12 pages.
Liu, Xin et al., Preparation and properties of waterborne polyurethanes with natural dimer fatty acids based polyester polyol as soft segment, Progress in Organic Coatings, 2011, pp. 612-620, vol. 72.
European Office Action in corresponding EP Application No. 17 745 912.0-1102 dated Nov. 7, 2019.

* cited by examiner

*Primary Examiner* — Robert D Harlan
(74) *Attorney, Agent, or Firm* — Vorys, Sater, Seymour and Pease LLP

(57) ABSTRACT

Embodiments described herein provide a coating composition including an aqueous acrylic/polyurethane dispersion. The aqueous acrylic/polyurethane dispersion is produced from at least one isocyanate component, a polyol mixture, and at least one acrylate solvent. The polyol mixture includes a polyester polyol and at least two different oleo-based polyols. The coating composition exhibits improved chemical resistance without sacrificing other properties, such as hardness and abrasion resistance.

22 Claims, No Drawings

AQUEOUS BASED POLYURETHANE/ACRYLATE HYBRID DISPERSIONS

CROSS-REFERENCE TO RELATED APPLICATIONS

This application claims priority to U.S. Provisional Patent Application Ser. No. 62/362,419 filed Jul. 14, 2016, and entitled "Aqueous Based Polyurethane/Acrylate Hybrid Dispersions," the entirety of which is incorporated by reference herein.

TECHNICAL FIELD

Embodiments of the present disclosure are generally related to aqueous based polyurethane/acrylate hybrid dispersions and methods of making such coatings, and are specifically related to one component aqueous based acrylic polyurethane coatings having improved chemical resistance.

BACKGROUND

One component aqueous based polyurethane coatings are used in a variety of applications. For example, these coatings may be used as a binder for decorative, protective and industrial coatings, including wood coatings (floor or furniture coatings and others), kitchen cabinets coatings, PVC window lineals coatings, PVC flooring coatings, interior or exterior architectural coatings and primers, concrete flooring coatings, automotive coatings and automotive plastics coatings, direct to metal coatings, industrial maintenance coatings, traffic marking paints, plastic coatings (i.e. for "3C" applications: computers, communications and consumer electronics), flame retardant coatings, textile top coat, overprint varnishes, elastomeric roof coatings. The coatings may also be used in glass fiber sizings, as laminating adhesives for flexible packaging, glossy film lamination, furniture and automotive applications, shoe soles, electronics, heat seals, floor-covering, cementitious sealing slurries, sub-floor and wall mastics, and as pressure sensitive adhesives. Additionally, the coatings may be suitable as binders for the production of caulks and sealants, carpet backing, leather finishing, in the production of dipped goods (i.e. gloves), or as an emulsion vehicle for printing inks. Although one component aqueous polyurethane coatings may be more environmentally friendly than solvent borne coatings and easier to use than two component polyurethane compositions, their performance, and specifically, their chemical resistance, may not be as desirable as solvent based or 2K alternatives.

Accordingly, there is a need for one component aqueous based polyurethane coating compositions that reduce the use of solvent additives that cause increased volatile organic compound (VOC) levels in the resultant coatings, while still providing desirable coating properties such as abrasion and chemical resistance. Also, binders with enhanced chemical resistance designed for one component aqueous based polyurethane coatings, can be used as well in two component (2K) coatings further enhancing their properties.

SUMMARY

According to one embodiment, a coating composition is provided and includes an aqueous acrylic/polyurethane dispersion. The aqueous acrylic/polyurethane dispersion is produced from at least one isocyanate component, a polyol mixture, at least one acrylate solvent. The polyol mixture includes a polyester polyol and at least two different oleo-based polyols. The coating composition exhibits improved chemical resistance without sacrificing other properties, such as hardness and abrasion resistance.

According to another embodiment, a coated substrate is provided and includes a substrate and an acrylic/polyurethane coating disposed on the substrate. The acrylic/polyurethane coating is produced from at least one isocyanate component, a polyol mixture, and an acrylate component. The polyol mixture includes a polyester polyol and at least two different oleo-based polyols.

In another embodiment, a method of manufacturing a one component acrylic polyurethane coating composition includes preparing a polyol mixture including a polyester polyol, a first oleo-based polyol, and a different oleo-based polyol. The method further includes mixing the polyol mixture with an isocyanate component in a reactive solvent including acrylic monomer.

In another embodiment, a method for producing a two component acrylic polyurethane coating composition includes mixing the component containing the acrylic polyurethane binder and an adequate hardener.

DETAILED DESCRIPTION

Embodiments are directed to acrylic polyurethane coatings produced from the reaction of isocyanates and polyol mixtures including at least two oleo-based polyols in the presence of a reactive acrylate solvent. The resultant acrylic polyurethane coatings made using the polyol mixture including a polyester polyol and at least two oleo-based polyols in the presence of a reactive acrylate solvent reduces the need for typical solvent additives that cause increased volatile organic compound (VOC) loading in the coating, while still obtaining desirable coating properties such as hardness, abrasion resistance, and chemical resistance.

In embodiments, the acrylic polyurethane coating is in the form of a dispersion. As used herein, the term "dispersion" refers to polymer solids distributed throughout an aqueous medium. In particular embodiments, the acrylic polyurethane coating is in the form of an acrylic/polyurethane hybrid dispersion in which acrylate-grafted polyurethane solids are dispersed in water. The acrylate-grafted polyurethane solids, more specifically, include one or more acrylate polymer chains obtained from one or more acrylate monomers grafted onto a polyurethane polymer backbone. In various embodiments, the acrylic polyurethane hybrid dispersion includes from about 20 wt % to about 50 wt % solids. In some embodiments, the acrylic polyurethane dispersion includes from about 30 wt % to about 40 wt % solids.

In various embodiments, the acrylic/polyurethane hybrid dispersion is used in a formulation for a one component acrylic polyurethane coating. In general, the formulation includes an isocyanate component, a polyol mixture, at least one acrylate solvent and, optionally, at least one acrylate/ urethane crosslinker. The isocyanate component may be, in various embodiments, an aliphatic diisocyanate or polyisocyanate. According to various embodiments, the polyol mixture generally includes at least two oleo-based polyols. In some embodiments, the polyol mixture may further include a polyester polyol.

In various embodiments, the acrylic polyurethane coating composition may include from about 2 wt % to about 25 wt %, from about 5 wt % to about 20 wt %, or from about 10 wt % to about 15 wt % of the polyol mixture based on the weight of the acrylic polyurethane aqueous dispersion.

In some embodiments, the polyol mixture may include at least one polyester polyol. The polyester polyol may have a number average molecular weight of from about 400 to about 6,000 g/mol, or even from about 600 to about 2,500 g/mol, and an OH functionality of from about 1.8 to about 4, or even from about 2 to about 3. In some embodiments, the polyester polyol is obtained by the polycondensation of dicarboxylic acids with polyols. The dicarboxylic acids may be aliphatic, cycloaliphatic or aromatic, and/or their derivatives, such as anhydrides, esters, or acid chlorides. Examples may include succinic acid, glutaric acid, adipic acid, pimelic acid, suberic acid, azelaic acid or sebacic acid, phtalic acid, isophtalic acid, trimellitic acid, phtalic anhydride, tetrahydrophtalic anhydride, glutaric anhydride, maleic acid, maleic anhydride, fumaric acid, dimeric fatty acid and dimethyl terephthalate. Suitable polyols include, by way of example and not limitation, monoethylene glycol, 1,2-propanediol, 1,3-propanediol, 1,4-butanediol, 3-methylpentane-1,5-diol, neopentyl glycol (2,2-dimethyl-1,3-propanediol), 1,6-hexanediol, 1,8-octaneglycol cyclohexanedimethanol, 2-methylpropane-1,3-diol, diethyleneglycol, triethyleneglycol, tetraethyleneglycol, polyethyleneglycol, dipropyleneglycol, polypropyleneglycol, dibutyleneglycol, and polybutyleneglycol. In embodiments, the polyester polyol may be a polycaprolactone polyol or a hyperbranched polyol. In one particular embodiment, the polyester polyol is a polyester diol of hexanediol and adipic acid with an average molecular weight of about 1,000 g/mol and an OH functionality of 2. One suitable polyester polyol is commercially available as Hoopol F-920 from Synthesia Internacional SLU (Barcelona, Spain).

In some embodiments, the polyester polyol may be substituted for other kinds of polyols, including polycarbonate polyols and polyether polyols.

Suitable polycarbonates are those obtainable, for example, by reaction of carbonic acid derivatives, for example diphenyl carbonate, dimethyl carbonate or phosgene, with polyols, preferably diols. Useful diols of this kind include, for example, ethylene glycol, propane-1,2- and 1,3-diol, butane-1,3- and 1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols.

Suitable polyether polyols, these are preferably polyaddition products of the styrene oxides, of ethylene oxide, propylene oxide, tetrahydrofuran, butylene oxide, epichlorohydrin, and the mixed addition and grafting products thereof, and the polyether polyols obtained by condensation of polyhydric alcohols or mixtures thereof and those obtained by alkoxylation of polyhydric alcohols, amines and amino alcohols.

In embodiments, the polyol mixture may include from about 1 wt % to about 90 wt % of the polyester polyol, or from about 10 wt % to about 90 wt % of the polyester polyol, or from about 30 wt % to about 80 wt % of the polyester polyol, or from about 50 wt % to about 70 wt % of the polyester polyol based on the weight of the polyol mixture in the dispersion. When polycarbonate or polyether polyols are used in place of the polyester polyol, they may be included in the same amounts as the polyester polyols described herein.

The polyol mixture may further include at least two different oleo-based polyols. As used herein, the term "oleo-based polyol" refers to a polyol derived from plant and/or animal fats. For example, in embodiments, the polyol mixture includes a hydroxyl functionalized oil polyol and an oligomer alcohol derived from fatty acids.

The hydroxyl functionalized oil polyol may be, in some embodiments, a vegetable oil that has been epoxidized and subject to nucleophilic attack. The vegetable oil can be, by way of example and not limitation, castor oil, linseed oil, or soy bean oil. Other oils, including but not limited to sunflower oil, rapeseed oil, or the like, may be used. In such embodiments, the nucleophilic reagent may be, by way of example and not limitation, water, an alcohol, an alkanolamine, or an amine. The resulting functionalized oil may optionally be subjected to ethoxylation or propoxylation. In one particular embodiment, the hydroxyl functionalized oil polyol is an ethoxylated vegetable oil with an OH value of 80 mg KOH/g and an average functionality of about 3.1. One suitable hydroxyl functionalized oil polyol is commercially available as Merginol® 207 from Hobum Oleochemicals GmbH (Hamburg, Germany).

In various embodiments, the hydroxyl functionalized oil polyol may have the following structure:

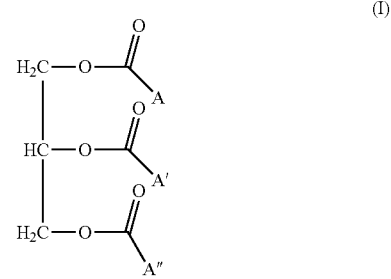

(I)

in which A, A', and A" are independently selected from:

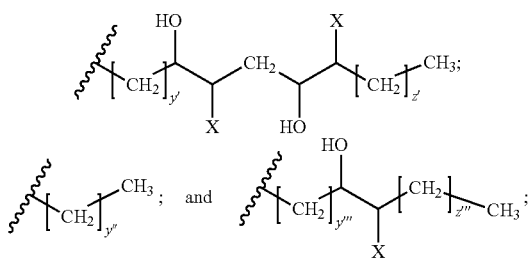

in which X is independently selected from —OH, —OROH, —NHROH, —N(ROH)$_2$, or —OC(O)R; R is independently selected from any alkyl chain, —(CH$_2$—CH$_2$—O)$_n$CH$_2$CH$_2$—, or —(CH$_2$—CH(CH$_3$)—O)$_n$CH$_2$—CH(CH$_3$)—; and y', y", y'", z', z", and z'" are independently selected to be an integer from 1 to 16.

It is further contemplated that chemical modification of the natural oil is incomplete, and some unreacted moieties (e.g., unsaturations or other intermediate moieties) may be present. Moreover, X and R groups differing from those provided above are contemplated. In some particular embodiments, the hydroxyl functionalized oil polyol may have the following structure:

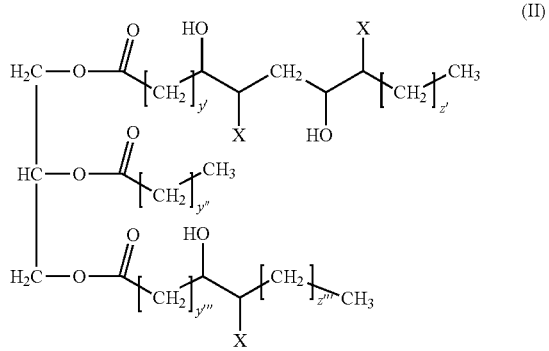

(II)

where each X, y', y'', y''', z', z'', and z''' are defined as above.

The polyol mixture may include from about 1 wt % to about 70 wt % of the hydroxyl functionalized oil polyol, or from about 5 wt % to about 50 wt % of the hydroxyl functionalized oil polyol, or from about 15 wt % to about 30 wt % of the hydroxyl functionalized oil polyol based on the weight of the polyol mixture in the dispersion.

In various embodiments, the polyol mixture may further include at least one oligomer alcohol derived from fatty acids. The oligomer alcohol derived from fatty acids may be, by way of example and not limitation, a dimer, a trimer, or a tetramer derived from one or more fatty acids. The fatty acids from which the oligomer is derived may be short chain fatty acids, medium chain fatty acids, or long chain fatty acids, or a combination thereof. In some embodiments, the fatty acids from which the oligomer is derived is a medium chain fatty acid, a long chain fatty acid, or a combination thereof. As used herein, a "medium chain fatty acid" refers to a fatty acid having from about 6 to about 12 carbon atoms. As used herein, a "long chain fatty acid" refers to a fatty acid having from greater than about 12 carbon atoms. In embodiments, the fatty acid may be a dimerized fatty acid. In some embodiments, the oligomer is a dimer diol or trimer triol derived from one or more medium or long chain fatty acids.

In one particular embodiment, the oligomer alcohol derived from fatty acids is a dimer diol obtained by the conversion of unsaturated fatty acids into a molecule with 36 carbon atoms via dimerization and reduction of the resulting diacid to a diol. The resulting dimer diol may have an OH value of from about 202 to about 212 mg KOH/g. One suitable dimer diol is commercially available as Pripol™ 2033 from Croda International Plc (Snaith, England).

In embodiments, the polyol mixture may include from about 1 wt % to about 70 wt % of the oligomer derived from fatty acids, or from about 5 wt % to about 50 wt % of the oligomer derived from fatty acids, or from about 10 wt % to about 25 wt % of the oligomer derived from fatty acids based on the weight of the polyol mixture in the dispersion.

Various compositions are considered suitable for the isocyanate component. The isocyanate component includes one or more aliphatic or aromatic isocyanates, products of condensation thereof, or derivatives thereof. In embodiments, the isocyanate has a functionality of from about 1 to about 3. The isocyanate may be, for example, an aliphatic or aromatic diisocyanate, a product of condensation of an aliphatic or aromatic diisocyanate, or a derivative of an aliphatic or aromatic diisocyanate such as an allophonate, biruret, isocyanurate, urethane, iminooxadiazinedione, oxadiazinetrione or uretdione. In various embodiments, the isocyanate component includes at least one aliphatic diisocyanate.

For example, in some embodiments the isocyanate component may include tetramethylene diisocyanate, hexamethylene diisocyanate, 2,2,4- and/or 2,4,4-trimethylhexamethylene diisocyanate, pentamethylene diisocyanate (PDI), isocyanatomethyloctane 1,8-diisocyanate, cyclohexylene 1,4-diisocyanate, phenylene 1,4-diisocyanate, 1,3- and 1,4-bis(2-isocyanato-prop-2-yl)benzene (TMXDI), 1,3-bis(isocyanatomethyl)benzene (XDI), naphthylene 1,5-diisocyanate, triphenyhnethane 4,4',4"-triisocyanate, 4,4'-diisocanato-diphenylmethane, 2,4'-diisocyanato-diphenylmethane, 2,4-diisocyanato-toluene, 2,6-diisocyanato-toluene, α,α,α',α'-tetramethyl-m- or -p-xylylene diisocyanate, 4,4'-, 2,2'- and 2,4'-diiscocyanato-dicyclo-hexylmethane (H12MDI) or mixtures thereof with any isomer content, 1-isocyanato-3,3,5-trimethyl-5-isocyanatomethylcyclohexane (isophorone diisocyanate), a product of condensation thereof, a derivative thereof such as an allophonate, biruet, isocyanurate, urethane, iminooxadiazinedione, oxadiazinetrione or uretdione, and mixtures thereof. In one particular embodiment, the isocyanate component is 4,4'-diiscocyanato-dicyclo-hexylmethane (H12MDI).

The amount of isocyanate component may vary based on application. In some embodiments, the polyurethane coating composition may include from about 4 wt % to about 20 wt %, from about 6 wt % to about 15 wt %, or even from about 8 wt % to about 12 wt % of the isocyanate based on the weight of the acrylic polyurethane aqueous dispersion.

In various embodiments, the isocyanate component and the polyol mixture are mixed in a reactive solvent including one or more acrylic components, such as one or more acrylic monomers. In some embodiments, the one or more acrylic monomers may be, for example, one or more acrylic acid ester monomers, one or more methacrylic acid ester monomers, or a combination thereof. Suitable monomers include, by way of example and not limitation, acrylic acid, methacrylic acid, methyl acrylate, ethyl acrylate, propyl acrylate, butyl acrylate, 2-ethylhexylacrylate, methyl methacrylate, ethyl methacyrlate, butyl methacrylate, 2-ethylhexylmethacrylate, styrene, methyl styrene, isobornyl acrylate, and the like. In one particular embodiment, the reactive acrylic solvent is methyl methacrylate (MMA). Without being bound by theory, it is believed that the reactive acrylic solvent may reduce or eliminate the need for a VOC solvent, lower the cost of the coating formulation, and provide synergistic properties, as the grafted acrylate is homogeneously distributed in the polyurethane matrix.

In various embodiments, the coating formulation further includes one or more acrylate/urethane crosslinkers which may be used as an acrylic end-capping agent to allow acrylic-polyurethane graft copolymers to form, improving the compatibility between acrylic and polyurethane components. The acrylate/urethane crosslinker may be, for example, a double bond-containing hydroxyl functional linker. The double bond-containing hydroxyl functional linker contains double bonds which can be polymerized by free-radical polymerization, such as hydroxy-functional acrylates and/or methacrylates. Examples of suitable acrylate/urethane crosslinkers include, but are not limited to, 2-hydroxyethyl(meth)acrylate (HEMA), polyethylene oxide mono(meth)acrylates, polypropylene oxide mono (meth) acrylates, polyalkylene oxide mono(meth)acrylates, poly(ε- caprolactone) mono(meth)acrylates, 2-hydroxypropyl (meth)acrylate, 4-hydroxybutyl(meth)acrylate, 3-hydroxy-2,2-dimethylpropyl(meth)acrylate, the mono-, di-, tri-, or tetraacrylates of polyhydric alcohols, such as trimethylolpropane, glycerol, pentaerythritol, dipentaerythritol, ethoxylated, propoxylated, or alkoxylated trimethylolpropane, glycerol, pentaerythritol, dipentaerythritol or technical grade mixtures thereof. In some embodiments, acrylate/urethane crosslinkers may include alcohols which can be obtained from the reaction of acids containing double bonds with monomeric epoxide compounds which optionally contain double bonds, such as the reaction products of (meth)acrylic acid with glycidyl (meth)acrylate or with the glycidyl ester of versatic acid. In one particular embodiment, the acrylate/urethane crosslinker is 2-hydroxyethyl(meth)acrylate (HEMA). The amount of acrylate/urethane crosslinkers may be from about 0.05 wt % to about 2 wt %, from about 0.1 wt % to about 1 wt %, or from about 0.2 wt % to about 0.5 wt % of the acrylic polyurethane aqueous dispersion.

The formulation may further include additives or other modifiers. For example, one or more polymerization catalysts may be employed. Catalysts may include, by way of example and not limitation, amine catalysts, tin catalysts, peroxide catalysts, and the like. In embodiments, amine and/or organometallic (for example tin, bismuth, zirconium, zinc) catalysts may be employed for the polycondensation reaction to yield the polyurethane while a peroxide catalyst may be employed for the polymerization of the acrylic. In some embodiments, the polyurethane coating composition may be free of amine and/or tin catalysts. The total amount of catalyst may be from about 0.01 wt % to about 0.2 wt %, from about 0.03 wt % to about 0.15 wt %, or from about 0.05 wt % to about 0.1 wt % of the polyurethane coating composition, depending on the nature of the isocyanate and acrylic monomers and/or depending on whether the catalyst is provided in a carrier, as would be understood by a person of ordinary skill in the art. Tin catalysts may include tin salts, such as the stannous salts of carboxylic acids. Amine catalysts may include, by way of example and not limitation, tertiary amine catalysts. Tertiary amine catalysts include organic compounds that contain at least one tertiary nitrogen atom and are capable of catalyzing the hydroxyl/isocyanate reaction between the isocyanate component and the isocyanate reacting mixture. Peroxide catalysts may be any of the various inorganic peroxy compounds or organic hydroperoxide compounds known to be active in producing free radicals to initiate polymerization provided that said compounds are soluble in the aqueous/organic media in which the polymerization takes place. Illustrative of such peroxide catalysts are the ammonium and alkali metal persulfates, tertiary alkyl hydroperoxides, such as tertiary butyl hydroperoxide, and the like.

Formulations may also include other additives, such as additives known to one of ordinary skill in the art for use in acrylic polyurethane coatings. Examples additives include fillers, chain extenders, moisture scavengers, demolding agents, antifoaming agents, adhesion promoters, curatives, pH neutralizers, UV stabilizers, antioxidants, plasticizers, compatibilizers, flame retardants, flame suppressing agents, smoke suppressing agents, antimicrobial agents, air release agents, rheology modifiers, wetting additives, and/or pigments/dyes. For example, pigments such as titanium dioxide and/or carbon black may be used to impart color properties to the acrylic polyurethane coating composition. Pigments may be in the form of solids or the solids may be predispersed in a resin carrier prior to being added to the acrylic polyurethane coating composition.

The acrylic polyurethane coating composition may further include one or more stabilizing anionic polyols, which stabilize the dispersion. The stabilizing anionic polyol may be present in an amount of from about 0.2 wt % to about 7 wt %, from about 0.5 wt % to about 5 wt %, or from about 1.0 wt % to about 3 wt % of the acrylic polyurethane aqueous dispersion. The stabilizing anionic polyol may be, by way of example and not limitation, dimethylolpropionic acid (DMPA), dimethylolacetic acid, dimethylol butanoic acid (DMBA), dimethylol valeric acid/sulfonate, hydroxypivalic acid, dihydroxysuccinic acid, or combinations thereof. It is likewise possible to use sulphonic acid diols optionally having ether groups, of the kind described in U.S. Pat. No. 4,108,814. In one particular embodiment, the stabilizing anionic polyol is dimethylolpropionic acid (DMPA).

In various embodiments, the acrylic polyurethane coating composition is free from co-solvents. As used herein, the term "co-solvent" means solvents used in addition to the reactive acrylate solvent and polyols present in the polyol mixture. Such co-solvents may include, by way of example and not limitation, glycols, glycol ether, 2,2,4-trimethyl-1,3-pentanediol monoisobutyrate, alcohols, mineral spirits, and benzoate esters.

In various embodiments, the acrylic polyurethane coating composition is prepared as a one component system i.e., an aqueous dispersion. In such embodiments, a polyurethane prepolymer is formed by mixing the reaction components, including the polyol mixture, the reactive acrylate solvent, the catalyst, and with an excess amount of the isocyanate component. For example, the reaction components may be added to a reactor and the reaction may be allowed to proceed until a constant isocyanate content is obtained. In various embodiments, the reaction is allowed to proceed until the amount of unreacted isocyanate groups (% NCO) is between about 3% and about 4%. In one particular embodiment, the % NCO is about 3.4%. In embodiments, a portion of the acrylate monomer (in the reactive acrylate solvent) may be added to the polyurethane once it is created. However, in embodiments, at least part of the reactive acrylate solvent is added before dispersing in water to reduce the viscosity and aid in the dispersion.

Prior to the dispersion in water, the stabilizing anionic polyols are neutralized with a suitable neutralizing agent. The neutralizing agent can also be added to the water in which the prepolymer is going to be dispersed before the dispersion process takes place. Suitable neutralizing agents may be selected, for example, from the group consisting of triethylamine, N-ethylmorpholine, dimethylisopropylamine, ethyldiisopropylamine, dimethylcyclohexylamine, triethanolamine, dimethylethanolamine, ammonia, potassium hydroxide, sodium hydroxide and any desired mixtures thereof. Following the dispersion of the prepolymer in water, a suitable chain extender is added to the resulting dispersion that reacts with the remaining isocyanate groups and increases the molecular weight of the polymer. NCO-reactive groups used in the chain extender contain generally amino groups, since both primary and secondary amines are very reactive toward NCO groups, but may also contain hydroxyl groups. The water present in the dispersion as continuous phase can also be used as chain extender in the absence of other more reactive chain extenders. Suitable chain extenders include, for example, ethylene-1,2-diamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 4,4-diaminodicyclohexylmethane, hydrazine hydrate, and/or dimethylethylenediamine, diethanolamine, 3-amino-1-methylaminopropane, 3-amino-1-ethylaminopropane, 3-amino-1-cyclohexylaminopropane, 3-amino-1-methylaminobutane, alkanolamines such as N-aminoethylethanolamine, ethanolamine, 3-aminopropanol, neopentanolamine, adipic dihydrazide, oxalic dihydrazide, carbohydrazide, succinic dihydrazide, or longer-chain amino-functional compounds such as polyetheramines ("Jeffamines"). Once the chain extension of the polymer has been done, a catalyst and a reducing agent may be added to polymerize the prepolymer. After polymerization, the acrylic polyurethane coating composition may be sprayed or otherwise deposited onto a substrate. The substrate may be, by way of example and not limitation, a wood substrate such as a wood floor or furniture, or another suitable type of substrate, for example paper, glass, metal, plastics, and the like. The acrylic polyurethane polymer then dries and the polymer particles coalesce to form a film on the substrate.

In various embodiments, the acrylic polyurethane coating exhibits a Pendulum hardness of greater than about 98 s, from about 98 s to about 130 s, from about 99 s to about 120 s, or from about 99 s to about 102 s, when measured in accordance with ISO 1522. In embodiments, the acrylic polyurethane coating exhibits a Taber abrasion of lower than about 60 mg or lower than about 50 mg when measured on a CS 17 roll at 1,000 rpm and 1,000 g. It is further believed that the acrylic polyurethane coating exhibits chemical resistance to the substances in accordance with DIN 68661 1A. In particular, various embodiments provide an acrylic polyurethane coating having an ethanol resistance of greater than or equal to about 4 as measured in accordance with DIN 68661 1A and evaluated according to DIN EN 12720.

EXAMPLES

The following examples are provided to illustrate various embodiments, but are not intended to limit the scope of the claims. All parts and percentages are by weight unless otherwise indicated.

Table 1 below lists Example 1 which is an example embodiment of the present formulation that includes a polyester polyol, two oleo-based polyols, and an acrylate solvent, and Comparative Examples 1-4, which include a polyester polyol, an acrylate solvent, and only one oleo-based polyol in proportions equal to their content in Example 1 or to the content of both oleo-based polyols together in Example 1. In the examples, the Hoopol F920 (a hexanediol adipate with an average molecular weight of 1,000 g/mol available from Synthesia Group) was added as the polyester polyol, Merginol® 207 (an ethoxylated oil-based polyol having an average functionality of 3.1 and an average OH value of 80 mg KOH/g available from Hobum Oleochemicals GmBH) was added as the hydroxyl functionalized oil-based polyol, Pripol™ 2033 (a dimer diol with an average OH value of 202-212 mg KOH/g available from Croda International Plc) was added as the dimer diol.

The compositions in Table 1 were prepared by combining the polyol mixture with 90 g of the reactive acrylic solvent, stabilizer, and acrylate linker and mixing at 60° C. to achieve complete homogenization. H12MDI was added to the homogenized mixture over 10 minutes at a temperature between about 50° C. and about 60° C.

TABLE 1

| Compositions | | Example 1 | Comp. Example 1 | Comp. Example 2 | Comp. Example 3 | Comp. Example 4 |
|---|---|---|---|---|---|---|
| Polyester Polyol | Polyol | 112.8 g | 112.8 g | 112.8 g | 150.4 g | 150.4 g |
| Hydroxyl Functionalized Oil-Based Polyol | Polyol | 37.60 g | 75.20 g | 0 | 37.60 g | 0 |
| Dimer Diol | Polyol | 37.60 g | 0 | 75.20 g | 0 | 37.60 g |
| DMPA | Stabilizer | 27.00 g | 27.00 g | 27.00 g | 27.00 g | 27.00 g |
| Hydroquinone monomethyl ether | Stabilizer | 0.03 g | 0.03 g | 0.03 g | 0.03 g | 0.03 g |
| MMA | Reactive acrylic solvent | 180.00 g | 180.00 g | 180.00 g | 180.00 g | 180.00 g |
| HEMA | Acrylate/ urethane linker | 4.00 g | 4.00 g | 4.00 g | 4.00 g | 4.00 g |
| H12MDI | isocyanate | 162.5 g | 145.50 g | 179.40 g | 149.65 g | 166.5 g |
| % NCO | | 3.4% | 3.2% | 3.7% | 3.3% | 3.5% |

The temperature of the mixture was raised to a temperature from between 65° C. and 70° C. and once the indicated % NCO was reached, an additional 90.00 g MMA was added to each composition and mixed. After mixing to homogenization, about 20.40 g of triethylamine was added to each composition to neutralize the DMPA and make the DMPA anionic. Each composition was chilled and distilled water was added with stirring to obtain a homogeneous dispersion.

To each dispersion, a diamine solution was added until the % NCO was less than about 0.20%. The resulting dispersions were then warmed to 40° C. and a 6% aqueous solution of ammonium persulfate and a substoichiometrical quantity of Bruggolite FF6 as a 1,5% aqueous solution were added to initiate the polymerization. The reaction mixture was then heated to 80° C. to and kept at this temperature until the polymerization is finished. The resulting dispersions were then cooled to 45° C. and a reducing agent was added. A 5% aqueous solution of tert-butyl hydroperoxide was then added to initiate polymerization of the residual monomer unreacted during the first polymerization reaction. Each reaction mixture was kept at 45° C. during the second polymerization reaction.

The resulting dispersions were used as binders to formulate a clear coating. In particular, Example 2 included the dispersion of Example 1, Comparative Example 5 included the dispersion of Comparative Example 1, Comparative Example 6 included the dispersion of Comparative Example 2, Comparative Example 7 included the dispersion of Comparative Example 3, and Comparative Example 8 included the dispersion of comparative Example 4. In addition, Comparative Example 9 was formulated using Ecrothan™ 2012, a polyester polyurethane hybrid acrylic that does not include an oleo-based polyol available from Michelman, Inc. (Cincinnati, Ohio). To each binder, water, butyl glycol (a coalescing agent), and various additives were added. As reported in Table 2, water was added in two parts, Part 1 being used to dilute the butyl glycol to 50%. In particular, the additives included TEGO® Twin 4200 (a wetting additive commercially available from Evonik Industries AG (Essen, Germany)), Acrysol™ RM-825 (a non-ionic urethane rheology modifier commercially available from The Dow Chemical Company (Midland, Mich.)), and BYK-093 (a VOC-free silicone-containing defoamer commercially available from BYK USA Inc. (Wallingford, Conn.)). The coating compositions are provided in Table 2 in grams (g).

TABLE 2

Coating Compositions

| Materials | Ex. 2 | Comp. Ex. 5 | Comp. Ex. 6 | Comp. Ex. 7 | Comp. Ex. 8 | Comp. Ex. 9 |
|---|---|---|---|---|---|---|
| Binder | 80.00 | 87.50 | 80.00 | 82.00 | 82.00 | 80.00 |
| Water (Part 1) | 8.00 | 5.00 | 8.00 | 6.00 | 8.00 | 5.00 |
| Butyl glycol | 8.00 | 5.00 | 8.00 | 6.00 | 8.00 | 5.00 |
| TEGO ® Twin 4200 | 0.50 | 0.50 | 0.50 | 0.50 | 0.50 | 0.30 |
| Acrysol ™ RM-825 | 0.30 | 0.25 | 0.30 | 0.50 | 0.40 | 0.50 |
| BYK-093 | 0.30 | 0.30 | 0.30 | 0.30 | 0.30 | 0.30 |
| Water (Part 2) | 2.90 | 7.27 | 2.90 | 6.89 | 4.10 | 8.90 |
| Total | 100.00 | 105.82 | 100.00 | 102.19 | 103.30 | 100.00 |

Pendulum hardness was measured for each of the coating compositions in accordance with ISO 1522 after 24 hours and after 7 days. Gloss retention was measured for each of the coating compositions in accordance with ISO 2813 at 20°, 60°, and 85°. Taber abrasion was measured for each of the coating compositions with a CS 17 roll at 1,000 rpm and 1,000 g. The results of the Pendulum hardness, gloss, and Taber abrasion tests are provided in Table 3 below.

TABLE 3

Test Results

| | Example 2 | Comp. Ex. 5 | Comp. Ex. 6 | Comp. Ex. 7 | Comp. Ex. 8 | Comp. Ex. 9 |
|---|---|---|---|---|---|---|
| Pendulum Hardness - 24 h | 100 s | 98 s | 88 s | 95 s | 73 s | 77 s |
| Pendulum Hardness - 7 days | 118 s | 121 s | 119 s | 126 s | 124 s | 101 s |
| Gloss 20° | 80 | 76 | 83 | 73 | 69 | 82 |
| Gloss 60° | 92 | 91 | 92 | 90 | 90 | 90 |
| Gloss 85° | 96 | 96 | 87 | 94 | 91 | 97 |
| Taber Abrasion | 46 mg | 78 mg | 39 mg | 68 mg | 37 mg | 38 mg |

As shown in Table 3, the coating of Example 2 showed gloss retention properties similar to Comparative Example 9, which employed a one component (1K) solventless (i.e., free of organic solvents) polyurethane/acrylic binder. Example 2 also showed an outstanding fast hardness development (i.e., hardness at 24 hours). Comparative Examples 5 and 7, both containing only the hydroxyl functionalized oil based polyol had hardness development and gloss retention properties similar to those of Example 2 at each measured angle. However, Comparative Examples 5 and 7 had unacceptably low abrasion resistance. Comparative Examples 6 and 8, both containing only the dimer diol demonstrated Pendulum Hardness, gloss retention, and Taber abrasion values similar to those of Example 2.

The coatings were also subjected to a number of chemical resistance tests in accordance with DIN 68661 1A and evaluated in accordance with DIN EN 12720. The chemicals provided in Table 4 were each stressed for 16 hours at room temperature. The results for each of the tests are provided in Table 4 on a scale of 1 to 5, where 1 is the worst and 5 is the best.

TABLE 4

Chemical Resistance Test Results

| | Example 2 | Comp. Ex. 5 | Comp. Ex. 6 | Comp. Ex. 7 | Comp. Ex. 8 | Comp. Ex. 9 |
|---|---|---|---|---|---|---|
| Coffee | 3 | 3 | 3 | 3.5 | 3.5 | 3 |
| Ethanol | 4 | 4 | 1 | 3 | 1 | 1 |
| Water | 4 | 5 | 5 | 5 | 4 | 5 |
| Atrix | 4 | 5 | 5 | 5 | 5 | 5 |
| Nivea Soft | 4 | 5 | 4 | 5 | 5 | 4 |
| Red wine | 5 | 5 | 5 | 5 | 5 | 5 |
| Plasticizer Loxanol 5060 | 5 | 5 | 4 | 5 | 4 | 4 |
| Ammonia | 2 | 2 | 2 | 2 | 2 | 2 |
| Acetone | 5 | 5 | n.d. | 5 | 1 | 1 |

As shown in Table 4, the compositions including two oleo-based polyols (Example 2) or different proportions of the hydroxyl functionalized oil-based polyol (Comparative Examples 5 and 7) exhibited improved chemical resistance to ethanol and acetone over the composition including no oleo-based polyols (Comparative Example 9). Example 2 and Comparative Example 9 further exhibited similar chemical resistance to coffee, water, Atrix, Nivea Soft, red wine, Plasticizer Loxanol 5060 and ammonia. While Comparative Examples 6 and 8, which contain different proportions of the dimer diol, but don't contain the hydroxyl functionalized oil-based polyol had previously demonstrated Pendulum Hardness, gloss retention, and Taber abrasion values similar to those of Example 2, it demonstrated poor ethanol and acetone (8) resistance. Surprisingly, the combination of two oleo-based polyols with a polyester polyol resulted in improved chemical resistance while maintaining other coating properties, such as Pendulum hardness, gloss retention, and Taber abrasion. This versatility in chemical resistance enables the coating to protect against damage from a wide range of chemicals.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A coating composition comprising an aqueous dispersion comprising acrylate-grafted polyurethane solids produced from:
    at least one isocyanate component;
    a polyol mixture, wherein the polyol mixture comprises at least two independently different oleo-based polyols; and
    at least one acrylate.

2. The coating composition of claim 1, wherein one of the at least two independently different oleo-based polyols comprises a hydroxyl functionalized oil.

3. The coating composition of claim 1, wherein one of the at least two independently different oleo-based polyols comprises an oligomer derived from fatty acids.

4. The coating composition of claim 3, wherein the oligomer comprises a dimer diol or a trimer triol.

5. The coating composition of claim 4, wherein the dimer diol or the trimer triol is derived from fatty acids selected from the group consisting of medium chain fatty acids having from about 6 to about 12 carbon atoms, long chain fatty acids having greater than about 12 carbon atoms, and combinations thereof.

6. The coating composition of claim 1, wherein one of the at least two independently different oleo-based polyols comprises a hydroxyl functionalized oil polyol and another of the at least two oleo-based polyols comprises a dimer diol derived from fatty acids.

7. The coating composition of claim 6, wherein the polyol mixture comprises from about 1 to about 90 wt. % polyester polyol based on a weight of the polyol mixture; from about 1 to about 70 wt. % hydroxyl functionalized oil polyol based on the weight of the polyol mixture; and from about 1 to about 70 wt. % dimer diol derived from fatty acids based on the weight of the polyol mixture.

8. The coating composition of claim 7, wherein the at least one isocyanate component is present in an amount from 4 to 20 wt. % based on a weight of the aqueous dispersion.

9. The coating composition of claim 1, wherein the at least one isocyanate component comprises an aliphatic diisocyanate.

10. The coating composition of claim 1, wherein the at least one acrylate comprises an acrylic or methacrylic monomer or mixtures thereof.

11. The coating composition of claim 1, wherein the polyol mixture further comprises at least one polyester polyol.

12. The coating composition of claim 1, wherein the acrylate-grafted polyurethane solids are further produced from at least one crosslinker.

13. A coated substrate, comprising:
    a substrate; and
    a coating comprising an acrylate-grafted polyurethane disposed on the substrate, wherein the coating is produced from a coating composition comprising an aqueous dispersion produced from:
    at least one isocyanate component;
    a polyol mixture, wherein the polyol mixture comprises at least two independently different oleo-based polyols; and
    at least one acrylate.

14. The coated substrate of claim 13, wherein one of the at least two independently different oleo-based polyols comprises a hydroxyl functionalized oil polyol and another of the at least two independently different oleo-based polyols comprises a dimer diol derived from fatty acids.

15. The coated substrate of claim 13, wherein the polyol mixture comprises from about 1 to about 90 wt. % polyester polyol based on a weight of the polyol mixture; from about 1 to about 70 wt. % hydroxyl functionalized oil polyol based on the weight of the polyol mixture; and from about 1 to about 70 wt. % dimer diol derived from fatty acids based on the weight of the polyol mixture.

16. The coated substrate of claim 13, wherein the at least one acrylate is grafted onto a polyurethane backbone formed from the polyol mixture and the at least one isocyanate component.

17. A method of manufacturing a one component aqueous coating composition comprising acrylate-grafted polyurethane solids, comprising:
    preparing a polyol mixture comprising a polyester polyol, a first oleo-based polyol, and an independently different oleo-based polyol; and
    mixing the polyol mixture with an isocyanate component and an acrylic monomer.

18. The method of claim 17, wherein the first oleo-based polyol comprises a hydroxyl functionalized oil polyol and the independently different oleo-based polyol comprises an oligomer derived from fatty acids.

19. The method of claim 18, wherein the polyol mixture comprises from about 1 to about 90 wt. % polyester polyol based on a weight of the polyol mixture; from about 1 to about 70 wt. % hydroxyl functionalized oil polyol based on the weight of the polyol mixture; and from about 1 to about 70 wt. % oligomer derived from fatty acids based on the weight of the polyol mixture.

20. The method of claim 17, wherein the one component aqueous coating composition is substantially free of co-solvents.

21. A coating composition comprising an aqueous dispersion comprising acrylate-grafted polyurethane solids produced from:
    at least one isocyanate component;
    a polyol mixture comprising a polyester polyol and at least two independently different oleo-based polyols, the polyol mixture comprising about 1 wt. % to about 90 wt. % of the polyester polyol; and
    at least one acrylate.

22. The coating composition of claim 21, wherein one of the at least two independently different oleo-based polyols comprises a hydroxyl functionalized oil polyol.

* * * * *